Jan. 5, 1965   H. M. GRAHAM ETAL   3,164,463
PROCESS FOR HANDLING IRON LADEN WASTES IN STEEL MILLS
Filed Oct. 10, 1961
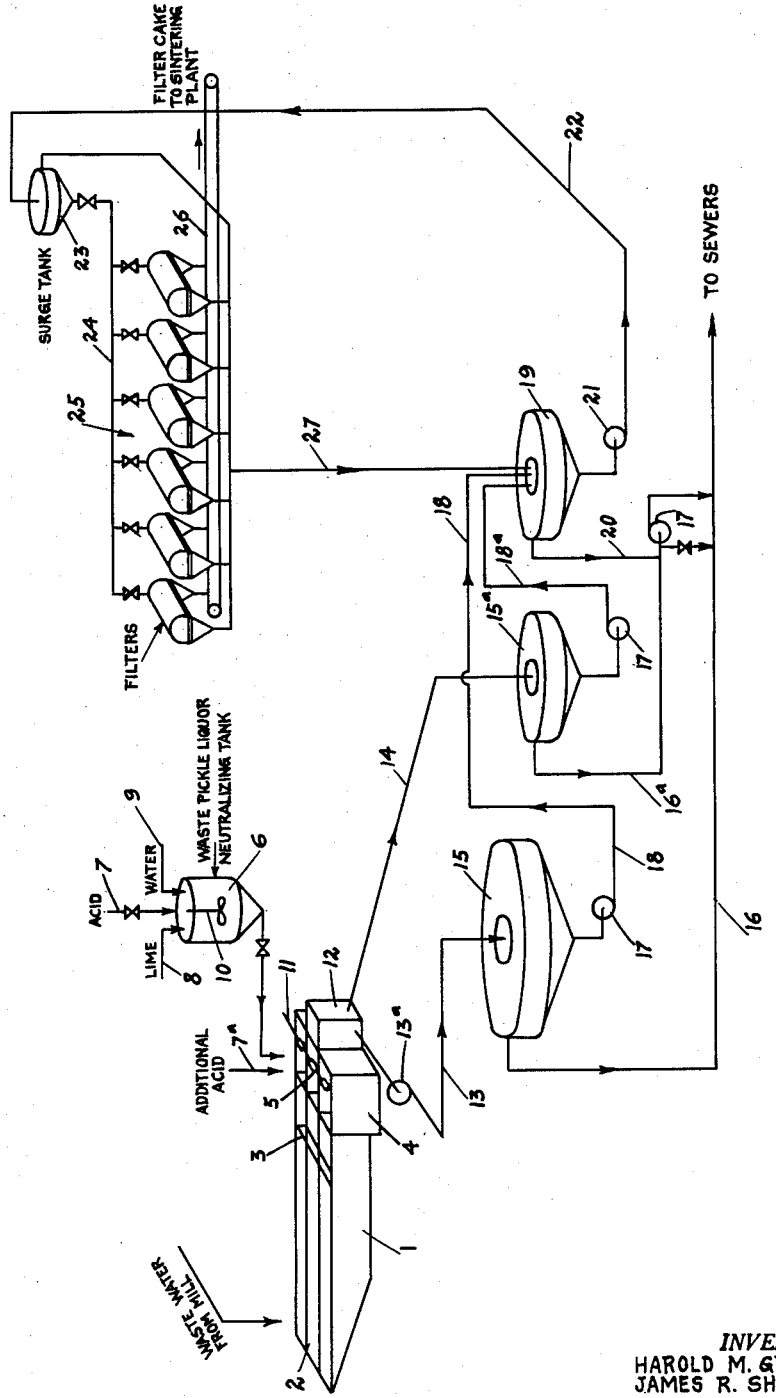
INVENTORS
HAROLD M. GRAHAM.
JAMES R. SHARPE.
BY
Christy, Parmelee & Strickland
ATTORNEYS.

United States Patent Office 3,164,463
Patented Jan. 5, 1965

---

3,164,463
PROCESS FOR HANDLING IRON LADEN WASTES IN STEEL MILLS
Harold M. Graham and James R. Sharpe, Pittsburgh, Pa., assignors to Dravo Corporation, Pittsburgh, Pa., a corporation of Pennsylvania
Filed Oct. 10, 1961, Ser. No. 144,158
2 Claims. (Cl. 75—97)

The present invention relates to two recurring problems in steel mill operation, pickle liquor disposal and reclamation of ore dust from blast and open-hearth furnaces. Stream conservation laws prohibit dumping of waste pickle liquor and many methods having been proposed and used to neutralize the sulphuric acid in the pickle liquor and to recover the iron therefrom. Most, if not all such methods are expensive and iron recovery, if any, is only inconsequential. Blast furnace flue dust recovery through electrostatic precipitators and wet washers and the fine oxide dust recovery from oxygen steel making processes provide much finely-divided particles ranging downward to micron and sub-micron sizes. These particles are initially received in waste water and must be separated therefrom. Many of such particles will pass through vacuum filter cloth and thus make difficult reclaiming from the water by vacuum filters.

One object of the present invention is to provide a process for reclamation of ore dust from waste water used in collecting said dust.

Another object is to provide a process for neutralization of the sulphuric acid in the waste pickle liquor and recovery of iron therefrom.

A further object of the invention is to provide a process for utilization of the neutralized waste pickle liquor to increase the yield of ore and iron oxide dust recovered from the waste water from steel mills.

These and other objects of the invention will be made apparent in the following specification and the drawing forming a part thereof showing a schematic arrangement of the apparatus and flow chart of the process.

The increasing use of electrostatic precipitators in the removal of ore dust from blast furnace gases and the improvements in wet washers for the same purposes, brings to the reclamation plant of the steel mill much finely-divided particles of ore dust suspended in the waste water from these recovery devices. The fine iron oxide dust recovery from oxygen steel making processes are particles of exceedingly fine rounded size and shape which are in the micron and sub-micron range. The particles are even more difficult to remove from the waste water in which they are suspended, than are the blast furnace flue dust.

One commonly used method of removing these suspended particles from the waste water has been the well known vacuum filter. Such means provides substantially satisfactory results when the filter cloth used therein will remove the suspended particles from the water flowing therethrough. The exceedingly fine particle sizes herein being dealt with results in a substantial volume thereof passing through the filter cloth with the water. Attempts have been made to increase the specific gravity of such water through the use of additives in the form of fine powders or coagulents to improve the settling of the ore and dust particles and thickening of the sludge water presented to the vacuum filters. These methods, however, are expensive to put into operation and are rather expensive to maintain.

In the present invention we have reduced and substantially eliminated the foregoing problems, while at the same time disposing the sulphuric acid in the of waste pickle liquor from the steel pickling operations and reclaiming therefrom the iron dissolved therein. In so doing we use a well known form of continuously discharging centrifugal filter for recovery of solids from the water. By the process of the invention, the filtrate is dry enough to be handled as a cake upon conveyor belts and represent a solids recovery of 95+%. The treatment of the sulphuric acid in the waste pickle liquor not only provides for recovery of the iron dissolved therein and neutralization of the spent sulphuric acid, but supplies the necessary coagulating effect to engulf the very fine suspended solids and enable them to be settled out in settling and thickening equipment. Tests have shown that overflow water from this equipment may be discharged from the mill containing not exceeding suspended solids of 5 grains per gallon, which is acceptable by clean streams authorities as satisfactory performance.

Referring now to the drawing, mill waste water and dust slurry from the blast furnaces and/or oxygen steel making processes are charged into a grit chamber 1, where the grit settling out may be suitably removed from one end 2 thereof. Preferably a suitable oil skim device 3, disposed within the chamber 1 would remove flotation oil from the water therein. Chamber 1 would have a gross capacity equal to at least three times the maximum gallons of water per minute to be received therein, to accommodate the mixing hereinafter referred to. The waste water, free from the grit, flows from the chamber 1 into an aeration tank 4 provided with suitable motor driven mixing and aerating devices 5.

Adjacent aeration tank 4 is provided a suitable acid neutralizing tank 6 into which are continuously discharged equal volumes of waste sulphuric acid pickle liquor from line 7, lime slurry from line 8 and water from line 9. These liquids within tank 6 are agitated by a suitable mixing device to neutralize the sulphuric acid of the pickle liquor giving the reactions $$H_2SO_4 + FeSO_4 + 2Ca(OH)_2 + H_2O \longrightarrow$$
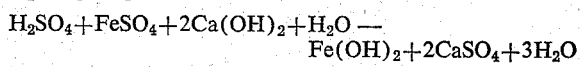
$$Fe(OH)_2 + 2CaSO_4 + 3H_2O$$

The $FeSO_4$ being provided by dissolved iron contained in the sulphuric acid. The reaction products are then discharged into the water of aeration tank 4 and are mixed and air blown therethrough from lines 11 for a suitable period such as 3 minutes where the highly water soluble ferrous sulphate is oxidized to form water insoluable ferric hydroxide $Fe(OH)_3$. The ferric hydroxide is a fluffy type precipitate having the capability of mass action and engulfs small particles in this mass action.

After the aforesaid three minute mixing period, the contents of aerating tank 4 is discharged into an adjacent pump suction well 12. From there the mixture is pumped or flows by gravity through lines 13 and 14 to one or more settling chambers 15 and 15a. Here the insoluble ferric hydroxide precipitates in the chambers and engulfs small particles of flue dust and iron oxides in the water carrying them to the bottom of the chambers. The excess clear water within the chambers overflows through lines 16 and 16a to the sewer or other discharge point.

From the bottom of chambers 15, 15a the precipitate is pumped by means of pumps 17 and lines 18, 18a into a suitable sludge thickening chamber 19. Here the precipitate is further concentrated at the bottom of 19 and the clear water overflows from the top of 19 into line 20 and into the sewer. The thickened precipitated sludge from the bottom of 19 is pumped by means of a suitable pump 21 and line 22 into a suitable surge tank 23. From tank 23 the precipitated sludge is passed by means of line 24 into a bank of suitable centrifugal filters 25 from which are continuously discharged a filter cake of 60–65% solids onto a conveyor 26 for delivery to a suitable sintering plant. The water from the centrifugal filters 25 is returned through lines 27 to the sludge thickener tank 19 for further removal of any suspended solids. Any overflow from surge tank 23 may likewise be diverted into line 27.

It will be obvious from the foregoing that at each step or passage of the mill waste water and neutralized spent pickle liquor through tanks 15, 15a and 19 much clear water, free of entrapped particles, is discharged from the system, so that only a portion of the total volume of water and solids from the mixing tank 4 reaches the centrifugal filters 25. By way of illustration and not limitation, one installation of the process of the invention handling a maximum of 35,000 g.p.m. of mill waste water, delivered under 600 g.p.m. to the sludge thickener tank and only 300 g.p.m. of thickened sludge to the centrifugal filters. The clean water discharged to the sewer had less than 5 grains of solids per gallon.

The herein described process has proven both economical to operate and to provide a large percentage of solids recovery. Acetylene wastes can be utilized to provide lime for neutralization of the spent pickle liquor acid and to supply the necessary coagulating effect to engulf the very fine suspended solids and enable them to be settled out of the settling and thickening chambers. Although the calcium sulfate precipitate in the neutralization of the spent pickle liquor is concentrated in a relatively small quantity of water and remains practically insoluble, when mixed with the larger quantities of water, in the aerating and settling chambers, it will dissolve and pass through the overflow weirs of the settling and thickening chambers. Therefore, the sulphur in this material does not get back into the iron material which is reclaimed for reuse in the blast furnace. The ferrous hydroxide $Fe(OH)_2$ resulting from the neutralization of the spent pickle liquor and reaction of the lime slurry with ferrous sulphates in the said liquor is normally soluble in water but during aerating and agitation of the mixture of neutralized pickle liquor and incoming water wastes it is oxidized to an insoluble form ferric hydroxide, $Fe(HO)_3$. This ferric hydroxide is a fluffy type precipitate having the capability of mass action and engulfs small particles suspended in the water in this mass action, thus aiding removal of the small particles of flue dust and iron oxide in the mill waste water.

The preferred form of filter for practice of the invention is the centrifugal filter referred to herein. However, the process may be practiced with other forms of filtering device, such as a vacuum. This for the reason that the ferric hydroxide provides an excellent form of precipitatable material which engulfs and removes the fine particles of flue dust and oxides from the oxygen process used with open-hearth furnaces.

The process of the invention works well when neutralizing the spent sulphuric acid of the pickle liquor before mixing with the mill waste water in the mixing chambers. During mixing and aeration the amount of floc produced by reason of oxidation of the ferrous hydroxide to ferric hydroxide will of course be determined by the amount of neutralized acid present. Where the amount of floc produced becomes excessive in relation to the amount of waste water present, provision has been made in the drawing for addition of non-neutralized pickle liquor directly to the mixing and aeration chamber 4 by means of the line 7a. The amount admitted to chamber 4 will be determined by the relative quantities of waste water and neutralized sulphuric acid present in the mixing chamber during the mixing and aeration period. The admission of acid causes conversion of a portion of the floc to the soluble form ferrous hydroxide. A further determining factor would be the amount of suspended oxides to be removed from the mill water.

We claim:

1. A method for recovering suspended iron oxide dusts and iron bearing compounds from mill waste water and concurrently neutralizing the sulphuric acid of spent pickle liquor, comprising the steps of separately mechanically mixing substantially equal quantities of water, spent pickle liquor and a lime slurry to neutralize the sulphuric acid of the spent pickle liquor and provide the reaction products ferrous hydroxide and calcium sulphate, with the calcium sulphate in quantities greatly in excess of its solubility in the water, adding the mixture to collected mill waste water and vigorously aerating to convert the soluble ferrous hydroxide to insoluble ferric hydroxide and to dissolve substantially all the calcium sulphate in the aerated water, collecting and separating the aerated mixture into a clear effluent containing the dissolved calcium sulphate and a precipitated sludge, then dewatering the sludge in filters and passing the filter cake to a sintering furnace.

2. The method as defined in claim 1, wherein non-neutralized spent sulphuric acid pickle liquor is selectively added to the aerating step to control the formation of ferric hydroxide therein.

References Cited in the file of this patent
UNITED STATES PATENTS

| | | |
|---|---|---|
| 691,324 | Ramage | Jan. 14, 1902 |
| 1,269,442 | Hoffman | June 11, 1918 |
| 1,824,936 | Travers | Sept. 29, 1931 |
| 2,810,633 | Cooper | Oct. 22, 1957 |